March 24, 1953     M. L. STITH     2,632,253
TELESCOPE MOUNT

Filed Oct. 30, 1947     2 SHEETS—SHEET 1

MARCUS L. STITH
Inventor

By Lester B. Clark
& Ray L. Smith
Attorneys

March 24, 1953

M. L. STITH 2,632,253

TELESCOPE MOUNT

Filed Oct. 30, 1947

MARCUS L. STITH
Inventor

By Lester B. Clark
& Ray L. Smith
Attorneys

Patented Mar. 24, 1953

2,632,253

UNITED STATES PATENT OFFICE 2,632,253

TELESCOPE MOUNT

Marcus L. Stith, San Antonio, Tex., M. J. Stith, independent executor of said Marcus L. Stith, deceased Application October 30, 1947, Serial No. 783,145

19 Claims. (Cl. 33—50)

The invention relates to a telescope mount for firearms and in particular to a telescope mount readily adaptable to fit telescopes of different diameter.

Heretofore in the manufacture of firearms and telescopic mounts therefor, a great deal of difficulty has been encountered in attempting to provide a mount which may be readily secured to a gun but which is readily adjustable to fit various size telescopes and various size guns.

Another difficulty encountered is in attempting to provide a telescopic mount which is readily adjustable to move the telescope laterally with respect to the barrel of the gun to independently compensate for windage or at an angle with respect to the axis of the barrel to compensate for differences in range.

An object of the present invention is to provide a telescope mount for a firearm which may be readily secured to such firearm, such mount being so arranged and constructed whereby the telescope supported therein may be moved to various predetermined positions.

Another object of the invention is to provide a telescope mount for a firearm in which a 'scope may be readily secured in position.

Another object of the invention is to provide in a telescopic mount for a firearm, a pair of spaced brackets which may be readily positioned on the gun barrel.

Another object of the invention is to provide in a telescopic mount for a firearm, a pair of spaced brackets secured to the gun barrel, there being telescope support members movably mounted on each of said brackets.

Another object of the invention is to provide in a telescope mount, including a pair of brackets secured to a gun barrel and having support members movably mounted on each of said brackets, brake means associated with each of said brackets to locate said support members in various predetermined positions to prevent the telescope from slipping out of such predetermined setting.

Another object of the invention is to provide a telescope mount including two spaced brackets secured to a gun barrel, one of the brackets having a support member for the telescope thereon movable to position the telescope at an angle relative to the axis of the gun barrel.

Another object of the invention is to provide a telescope mount including two spaced brackets secured to a gun barrel or the receiver thereof, one of the brackets having a support member for the telescope thereon movable to position the telescope laterally with respect to the gun barrel and the other of said brackets having a support member thereon movable to adjust the supported telescope resting thereon to elevate and retract the telescope with respect to the gun barrel.

Another object of the invention is to provide an eccentric tubular adapter to fit a telescope, which adapter is provided with a concentric bore.

Another object of the invention is to provide a sleeve adapter for a telescope, which adapter serves as a protector for the wall of the telescope.

A further object of the invention is to provide a telescope mount on which a telescope may be quickly and easily positioned and removed.

Other objects and advantages of the invention will become more readily apparent from a consideration of the following description and drawings wherein.

Figure 1:
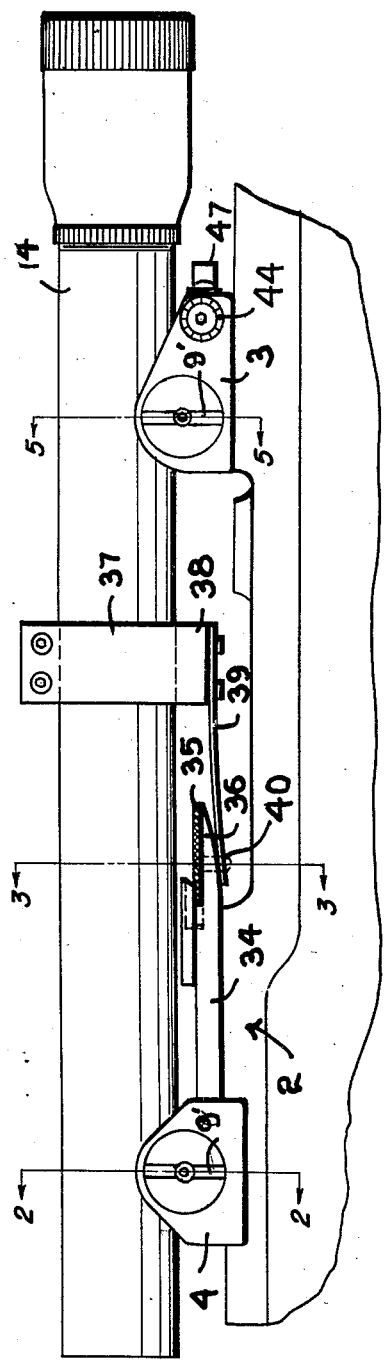
Fig. 1 is an elevation showing the preferred embodiment of the invention.
Figures 8, 9:
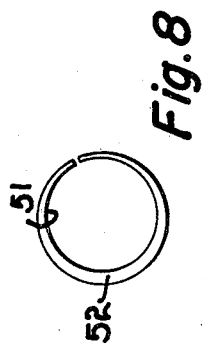
Fig. 8 is an end view of the tubular adapter shown in Fig. 7.
Fig. 9 is an end view of the tubular adapter showing the bracket for securing such adapter in position on the telescope.
Figure 3:
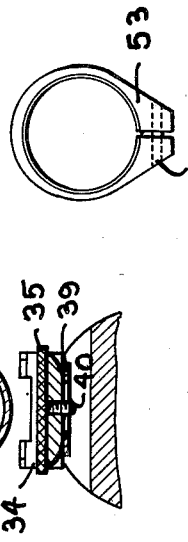
Fig. 3 is a sectional view taken on the line 3—3 of Fig. 1 and shows a means of securing the telescope on the mount.
Figure 2:
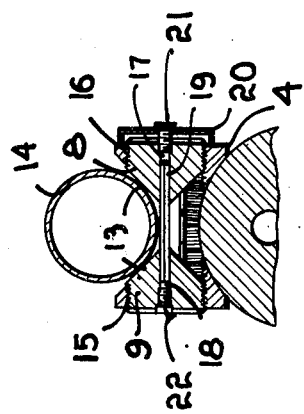
Fig. 2 is a sectional view taken on the line 2—2 of Fig. 1 and shows the arrangement whereby the telescope may be raised and lowered relative to the gun barrel.
Figure 4:
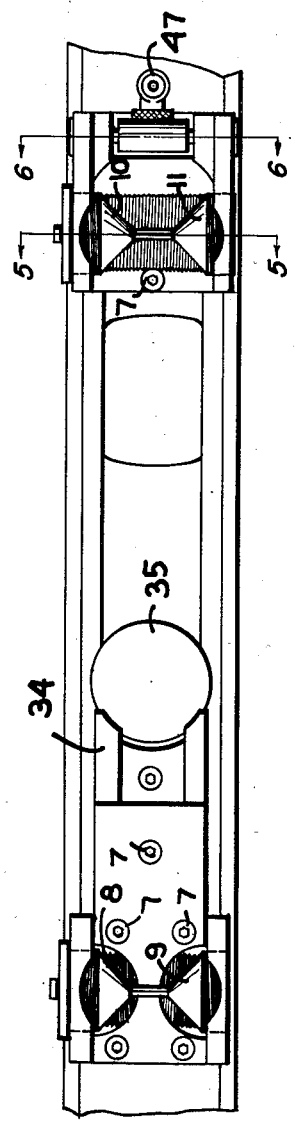
Fig. 4 is a top plan view of the telescope mount.

In Fig. 1 the telescope mount is denoted generally by the numeral 2 and is shown as comprising a pair of spaced brackets 3 and 4 secured to a gun barrel or to the receiver of a gun by suitable means such as Allen screws 7. Secured by suitable means such as threads in the brackets 3 and 4 is a pair of substantially cone shaped members 8, 9, 10, and 11. The cone members 8 and 9 are arranged in the bracket 4 so that their surface forms a support surface 13 for the telescope 14.

The cones 8 and 9 and the bracket 4 are provided with a right hand thread at 15 and a left hand thread at 16 so that rotation of the cones 8 and 9 will either move both of them inwardly towards each other or away from each other, depending upon which way the cone 9 is rotated. Each of the cone shaped members 8 and 9 is provided with an opening 17 and 18 extending therethrough which is provided with a non-circular shaped shaft 19 slidably fitting therein and connecting each of the cone shape members together.

Adjacent the cone shaped member 8 is a bracket or drum 20 which has a member 21 threadably secured in the end of the opening 17. The drum 20 rests upon the bracket 4. In order to firmly secure the cones 8 and 9 in position, the member 21 is rotated so that the brake drum 20 is firmly seated against the bracket, thereby holding the cone 8 against rotation.

The cone 9 has a cap screw 22 fitting in the end of the opening 18 to retain the non-circular shaft 19 in the assembly. It seems obvious that since the bracket 4 is provided with right hand threads on one side thereof, such as at 15, and with left hand threads on the other side thereof, such as at 16, the cone shaped members will move towards each other when the cone shaped member 9 is rotated in a right hand direction, due to the fact that the cones are interconnected by the shaft 19 slidably fitting within the hole 17 in the cone 8 and within the hole 18 in the cone 9. As the cones move towards each other, the telescope will be raised to an elevated position. In order to facilitate turning the cones 9 and 11, suitable means such as screw driver slots 9' are provided therein, whereby the cone may be rotated with a coin or the like.

The bracket 3 has cones 10 and 11 which are arranged to provide a support surface 25 for the telescope. Each of the cones 10 and 11 has an opening 26 extending therethrough. Slidably positioned in the opening 26 is a noncircular shaped shaft 27 which connects the two cone shaped members 10 and 11 together. The bracket 3 is provided with right hand threads 28 which engage the threads 29 of each of the cone shaped support members. Adjacent the cone 11 a cap screw 21 which is similar to cap screw 22 is provided to retain noncircular shaft 27 in the opening 26. A brake drum 32 is arranged adjacent the cone 10 which is similar to the brake drum 20 and has the member 33 threadedly secured therethrough and fitting into the end of the opening 26 to locate the cones 10 and 11 in a predetermined position and to keep them from slipping out of such position.

As the cone shaped member 11 is rotated in a right hand direction, each of the cones 10 and 11 will be moved laterally across the support bracket 3 since the threads 29 on each side of the bracket are both in a right hand direction, thereby moving the telescope at an angle with respect to the angle of the gun barrel.

Extending rearwardly from the forward support bracket 4 is an anchor plate 34 which is provided with a screw 35 arranged in the end 36 thereof. Secured on the telescope is an annular ring 37 which has at its lower end 38 a forwardly extending resilient spring finger 39 arranged to abut on the lower surface of the anchor plate 34. An opening 40 in the spring finger 39 is arranged so that the screw 35 may be engaged therein so as to position the telescope in position on the brackets 3 and 4. The resilient spring finger 39 maintains an even downward tension on the scope when it is positioned in the mount and also take the recoil thrust when the gun is fired. In order to remove the telescope from the brackets, it is only necessary that the screw 35 be loosened, thereby disengaging it from the finger 39. The telescope may then be lifted rearwardly and off each of the brackets 3 and 4.

Figure 6:
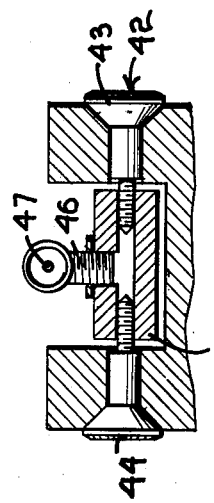
Fig. 6 is a sectional view taken on the line 6—6 of Fig. 4 and shows the arrangement of a peep sight.

In order to provide a sight when the telescope is not in use, fitting in the rear end of the bracket 3 is a peep sight construction 42 which comprises a pair of screws 43 and 44 secured in the threaded bracket 3, engaged at their inner ends in a substantially circular member 45 having the upstanding arm 46 located adjacent the central portion thereof which in turn has the peep sight 47 at the upper end thereof. In order to move the peep sight to a position for use, it is only necessary that it be lifted upwardly to a vertical position, as shown in Fig. 6. Attention is directed to the fact that the peep sight may be moved laterally with respect to the axis of the gun barrel to compensate for windage. Rotation of the screws 43 and 44 in the proper direction moves the circular member 45 and the peep sight 47 laterally of the gun.

Figure 7:
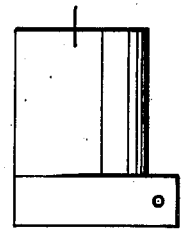
Fig. 7 is an elevation of the form of the tubular adapter for the telescope.
Figure 5:
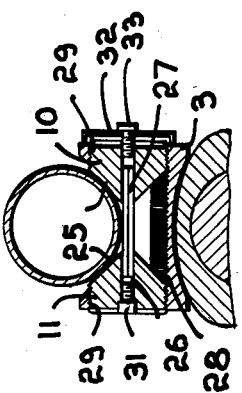
Fig. 5 is a sectional view on the line 5—5 of Fig. 1 and shows a means whereby the telescope may be moved laterally with respect to the gun barrel to compensate for windage.

Due to the fact that the shells of telescopes are somewhat thin and easily damaged, it may be advantageous to provide the telescope with an adapter split sleeve 50, as shown in Fig. 7. This sleeve may be slipped over the end of the telescope and positioned thereon adjacent the point of contact of the telescope with the brackets. The sleeve 50 has a concentric bore 51, but is eccentric as at 52 whereby the telescope may be off set slightly, if desired. In order to firmly position the adapter sleeve 50 upon the telescope 14, a clamp 53 is secured thereon which has a screw 54 so as to tighten the sleeve.

While the operation of the invention is believed apparent from the foregoing by way of further illustration and amplification, it will be assumed that the telescope is removed from the brackets 3 and 4 and that the user of the firearm desires to position the telescope thereon. The telescope 14 will be placed on the brackets 3 and 4 so that the finger 39 engages the nether side of the anchor plate 34 whereby the screw 35 may be engaged in the opening 40 of the finger 39 so as to position the telescope firmly in place on the brackets 3 and 4.

If the user of the firearm desires to elevate the forward end of the telescope, the member 31 threadedly secured through the brake drum 20 and into the opening 17 may be rotated so as to loosen the drum from engagement with the bracket 4. The cone shaped member 9 may then be rotated in a right hand direction, whereupon the noncircular shaft 19 transmits such rotation to the cone shape member 8 to move the cone shape members 8 and 9 towards each other.

When the desired elevation of the forward end of the telescope has been obtained, the member 21 is rotated so as to firmly secure the brake drum 20 against the bracket 4, thereby holding the cones against further movement.

If the user of the firearm desires to compensate for windage effects on the pellet, the cone shape members in the rear bracket 3 may be adjusted so as to move the rear portion of the telescope in the desired direction laterally of the gun. To accomplish this, it is only necessary that the brake drum 32 be disengaged from the bracket 3 by the member 33. The cone 11 is then rotated whereupon the shaft 27 transmits such rotation to the cone shaped member 10. Since the threads in the bracket 3 are both in the same direction, the cone shape members will move laterally thereof. When the telescope has been off set from the axis of the gun a desired number of degrees, the brake drum 32 may then be secured against the bracket 3 to firmly secure the telescope in its adjusted position.

In order to remove the telescope, it is only necessary as hereinabove mentioned, to release the screw 35 from engagement with the finger 39 whereupon the telescope may be removed off the brackets.

The adapter sleeve 50 may be positioned adjacent both, or either of the brackets 3 and 4. If it is desired to mount a second telescope on the first 'scope, the adapter sleeve may be positioned on the second 'scope abutting the first. The second 'scope can then be adjusted independently of the first by rotation of the sleeve 50 on the 'scope.

A second 'scope could theoretically be "zeroed" by use of excentric adapter sleeves 50, but in practice, it would be practically impossible. These sleeves 50 could only be used for approximate zeroing. A second or any number of telescopes, providing they have both elevation and windage internally, can be zeroed on the mount without affecting the zero of the original scope. Two or more 'scopes may be used interchangeably on the same rifle without affecting the zero of any of them.

It seems apparent from the foregoing, that the present invention contemplates a telescope mount which may be readily secured in position on a firearm and which mount is so constructed and arranged so that the telescope may be adjusted to various positions.

A telescope mount in accordance with this invention has been found to be quite satisfactory in use and is adaptable to various size firearms and can be used to support telescopes of different diameters upon a firearm.

Broadly the invention contemplates a telescope mount for firearms and particularly to a telescope mount readily adaptable for different size firearms and different size telescopes.

What is claimed is:

1. In a firearm the combination comprising, a bracket secured to the firearm, telescope support members movably mounted on said bracket, said support members having tapered surfaces to form a telescope support seat, means interconnecting said members to simultaneously move said members laterally of said bracket in the same direction said means including a noncircular shaft slidably fitting and connecting said telescope support members for movement together.

2. In a firearm the combination comprising, a bracket secured to the firearm, telescope support members movably mounted on said bracket, said support members having tapered surfaces to form a telescope support seat, means interconnecting said members to simultaneously move the members relative to each other said means including a noncircular shaft slidably fitting in and connecting said telescope support members together.

3. In a telescope support mount for a firearm, movable support members for mounting on the firearm, there being an opening in each of said members substantially centrally thereof and means for interconnecting said members to simultaneously move said members laterally of said firearm in the same direction said means including a noncircular shaft slidably fitting in and connecting said telescope support members for movement together.

4. In a telescope support mount for a firearm, movable support members for mounting on the firearm, there being an opening in each of said members substantially centrally thereof and means for interconnecting said members to simultaneously move said members relative to each other said means including a noncircular shaft slidably fitting in said opening and connecting said support members together.

5. In a gun telescope mounting having a bracket secured to a gun barrel and means for holding a telescope on the bracket so as to permit movements of the telescope relative to the gun barrel, the combination of, a support member having two frusto-conical surfaces held against rotation relative to each other and with their surfaces inclined toward each other to form a substantially V-shaped support for the telescope, the means for holding the telescope on the bracket urging the barrel of the telescope into the support, said member being mounted on the bracket for rotational and longitudinal movements, and means for moving the member to effect adjustment of the telescope relative to the gun barrel through the movement of the frusto-conical surfaces.

6. In a gun telescope mounting having a bracket secured to a gun barrel and means for holding a telescope on the bracket so as to permit movements of the telescope relative to the gun barrel, the combination of, a support having tapered surfaces inclined toward each other and joined together to form a seat for the telescope, the means for holding the telescope on the bracket urging the barrel of the telescope into the seat, said support being mounted on the bracket for movement of the tapered surfaces transversely of the gun barrel, and means for moving the tapered surfaces of the support to effect adjustment of the telescope relative to the gun barrel.

7. In a gun telescope mounting having a bracket secured to a gun barrel and yieldable means for holding a telescope on the bracket so as to permit movements of the telescope in horizontal and vertical planes, the combination of a support member having two frusto-conical surfaces held against rotation relative to each other and with their surfaces inclined toward each other to form a substantially V-shaped support for the telescope, the yieldable means urging the barrel of the telescope into the support, said member being mounted on the bracket for rotational and longitudinal movements, and means for moving the member to effect adjustment of the telescope relative to the gun barrel through the movement of the frusto-conical surfaces.

8. In a gun telescope mounting having a bracket secured to a gun barrel and yieldable means for holding a telescope on the bracket so as to permit movements of the telescope in horizontal and vertical planes, the combination of a support member having two frusto-conical surfaces held against rotation relative to each other and with their surfaces inclined toward each other to form a substantially V-shaped support for the telescope, the yieldable means urging the barrel of the telescope into the support, said member being threadedly mounted on the bracket, and means for rotating the member whereby the latter is moved longitudinally to effect adjustment of the telescope relative to the gun barrel.

9. In a gun telescope mounting having a bracket secured to a gun barrel and yieldable means for holding a telescope on the bracket so as to permit movements of the telescope in horizontal and vertical planes, the combination of, an annular ring secured on the telescope, said yieldable means including a resilient flat-like spring finger secured to said ring on the nether side of the telescope and extending from said ring in one direction only and in a plane alongside the telescope, an anchor plate secured to said bracket and extending toward said finger, and means adjacent the end of said plate and finger for securing said finger to said plate.

10. In a gun telescope mounting having a bracket secured to a gun barrel and yieldable means for holding a telescope on the bracket so as to permit movements of the telescope in horizontal and vertical planes, the combination of, means securing said yieldable means to the telescope, said yieldable means including a resilient flat-like spring finger secured to said means on the nether side of the telescope and extending from said means in one direction only and in a plane alongside the telescope, an anchor plate secured to said bracket and extending toward said finger, and additional means adjacent the end of said plate and finger for securing said finger to said plate.

11. In a gun telescope mounting for supporting telescopes of varying diameter, a support bracket telescope support members mounted on said bracket for rotational and longitudinal movements, said support members each having a tapered surface to form a support seat for the telescope, means connecting said support members for spacing said members a predetermined distance to accommodate telescopes of different diameter and for maintaining said spacing during movement of said members to effect adjustment of the telescope.

12. In a gun telescope mounting for supporting telescopes of varying diameter, a support bracket, telescope support members mounted on said bracket for rotational and longitudinal movements, said support members each having a tapered surface to form a support seat for the telescope, means for spacing said members a predetermined distance to accommodate telescopes of different diameter and for maintaining said spacing during movement of said members to effect adjustment of the telescope, said means including a noncircular shaft slidably fitting in each of said members and mounting them for movement together.

13. In a gun telescope mounting for supporting telescopes of varying diameter, a support bracket, telescope support members mounted on said bracket for rotational and longitudinal movements, said support members each having a tapered surface to form a support seat for the telescope, means for spacing said members a predetermined distance to accommodate telescopes of different diameter and for maintaining said spacing during movement of said members to effect adjustment of the telescope, said means including a noncircular shaft slidably fitting in each of said members and mounting them for movement together, and additional means for rotating said members to effect adjustment of the telescope relative to the gun.

14. In a gun telescope mounting, a support bracket, telescope support members movably mounted on said bracket, said support members each having a tapered surface to form a support seat for the telescope, a noncircular shaft slidably fitting in each of said support members and mounting them for movement together, and means for rotating said support members to move such members relative to each other on said shaft to effect adjustment of the telescope relative to the gun.

15. In a gun telescope mounting, a pair of support brackets, a pair of telescope support members movably mounted on each of said brackets, said support members each having an inclined surface to form a support seat for the telescope, a noncircular shaft slidably fitting in and connecting the said paired support members of a bracket for movement together, means for rotating one pair of said support members to move such members relative to each other on said shaft, and means for rotating the other pair of said support members to move such support members transversely of the gun, to effect adjustment of the telescope relative to the gun.

16. In a gun telescope mounting, a support bracket, telescope support members movably mounted on said bracket, said support members each having an inclined surface to form a support seat for the telescope, a noncircular shaft slidably fitting in each of said support members and mounting them for movement together, and means for rotating said support members to move such members relative to each other on said shaft to effect adjustment of the telescope relative to the gun, and means for locking said members in any relative position on said shaft.

17. In a gun telescope mounting, a pair of support brackets, a pair of telescope support members movably mounted on each of said brackets, said support members each having a tapered surface to form a support seat for the telescope, a noncircular shaft slidably fitting and connecting the said paired support members of a bracket for movement together, means for rotating one pair of said support members to move such members relative to each other on said shaft, and means for rotating the other pair of said support members to move such support members transversely to the gun to effect adjustment of the telescope relative to the gun, and additional means for locking the said paired members of a bracket at any predetermined position on each of said brackets.

18. In a gun telescope mounting, a support bracket, telescope support members movably mounted on said bracket, said support members each having a tapered surface to form a support seat for the telescope, a noncircular shaft slidably fitting in each of said support members and mounting them for movement together, and means for rotating said support members and said shaft to move such members and shaft transversely of the gun to effect adjustment of the telescope relative to the gun.

19. In a gun telescope mounting, a support bracket, telescope support members movably mounted on said bracket, said support members each having a tapered surface to form a support seat for the telescope and each having an opening substantially centrally thereof, a noncircular shaft fitting in said openings and connecting said members for movement together, and means for rotating said support members to effect movement thereof for adjustment of the telescope relative to the gun.

MARCUS L. STITH.

REFERENCES CITED

The following references are of record in the file of this patent:

UNITED STATES PATENTS

| Number | Name | Date |
|---|---|---|
| 563,226 | Gardner | June 30, 1896 |
| 740,327 | Stallcop | Sept. 29, 1903 |
| 917,799 | Saegmuller | Apr. 13, 1909 |
| 1,107,304 | Herman | Aug. 18, 1914 |
| 1,238,379 | Beaver | Aug. 28, 1917 |
| 1,517,363 | Kauch et al. | Dec. 2, 1924 |
| 1,938,216 | Damerell | Dec. 5, 1933 |
| 2,061,040 | Mossberg | Nov. 17, 1936 |
| 2,125,828 | Turner | Aug. 2, 1938 |
| 2,237,395 | Sweet | Apr. 8, 1941 |
| 2,260,354 | Wallace | Oct. 28, 1941 |
| 2,365,976 | Sorensen | Dec. 26, 1944 |
| 2,438,601 | Davis | Mar. 30, 1948 |
| 2,450,466 | Carlson | Oct. 5, 1948 |
| 2,452,145 | Pike | Oct. 26, 1948 |

FOREIGN PATENTS

| Number | Country | Date |
|---|---|---|
| 348,744 | Germany | 1922 |